Patented Oct. 3, 1922.

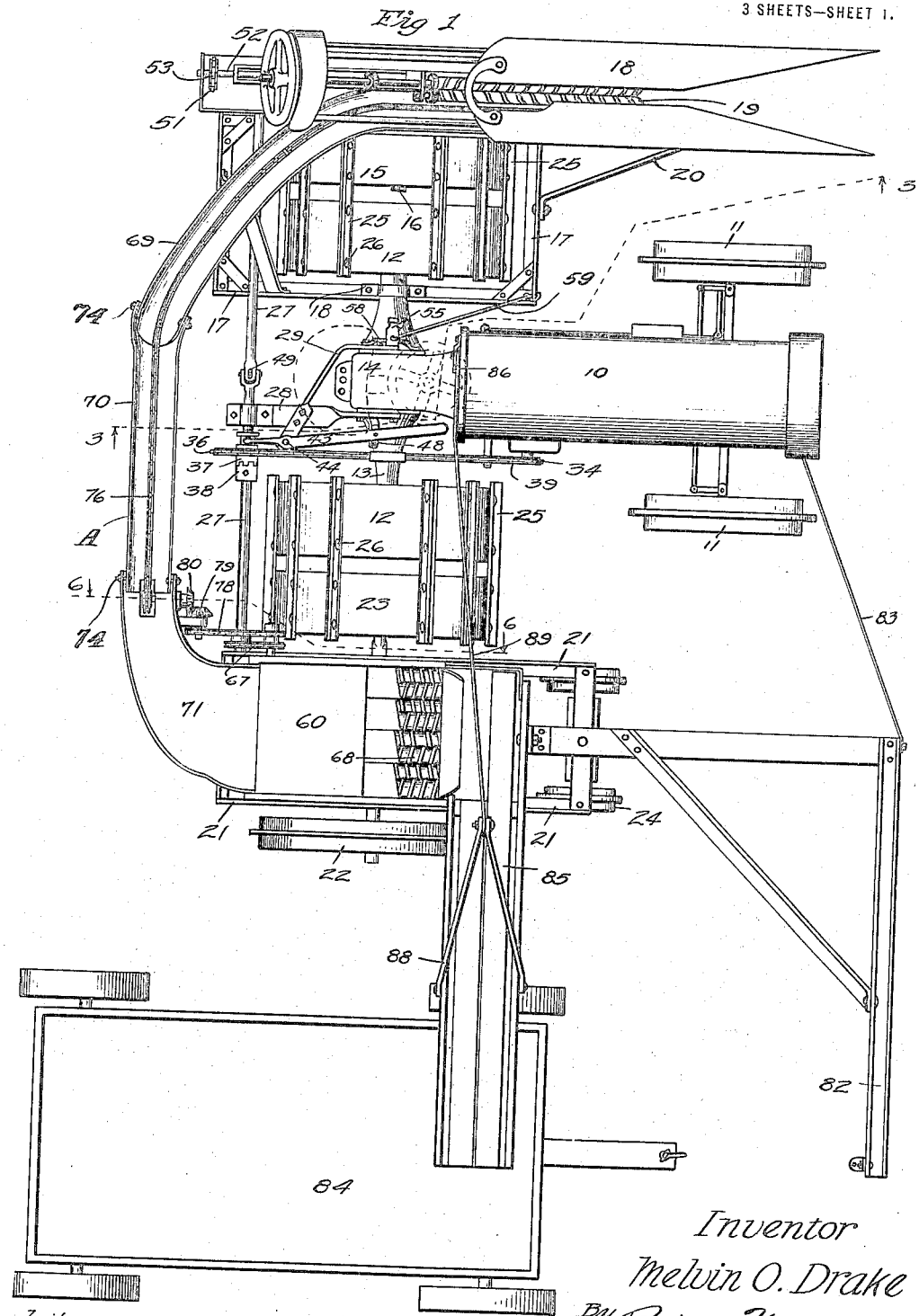

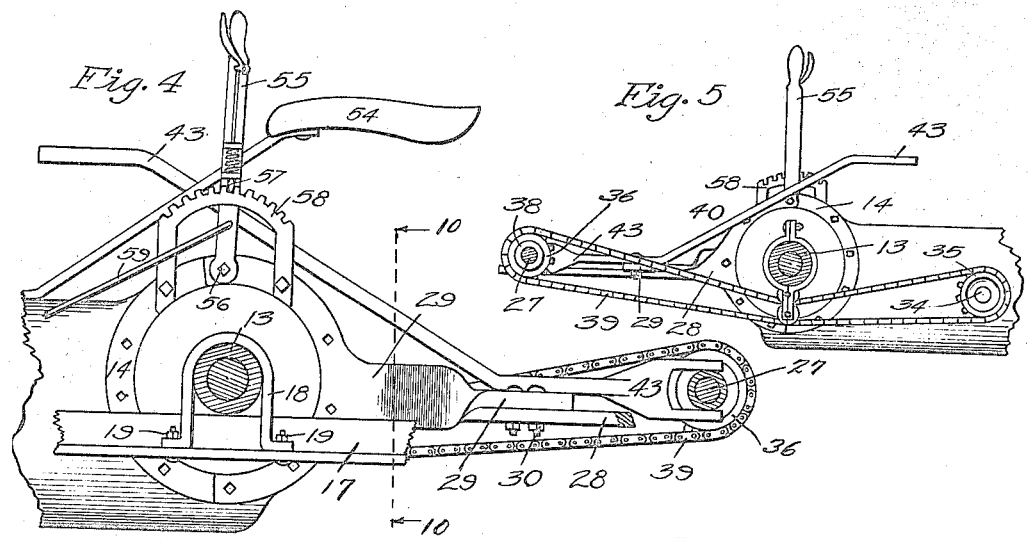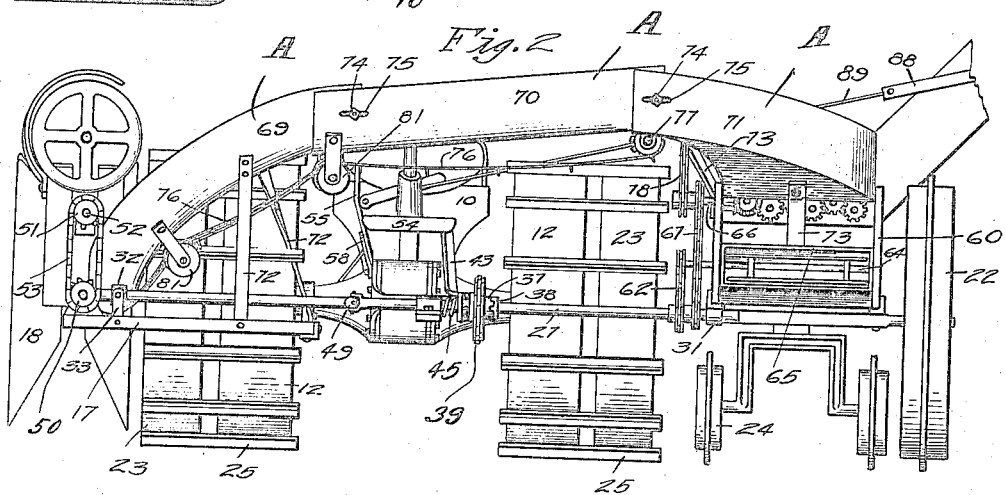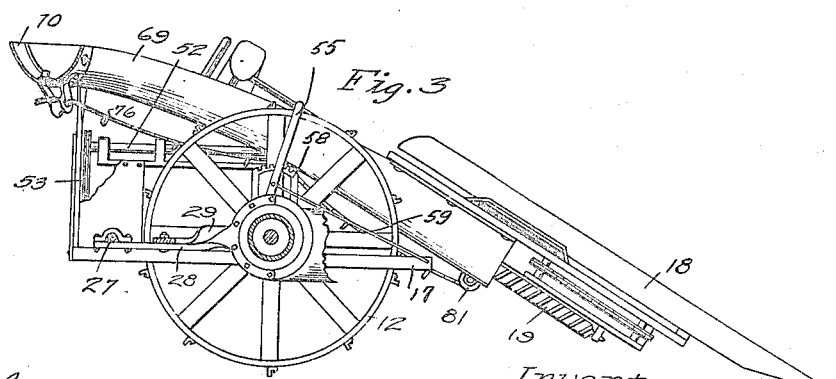

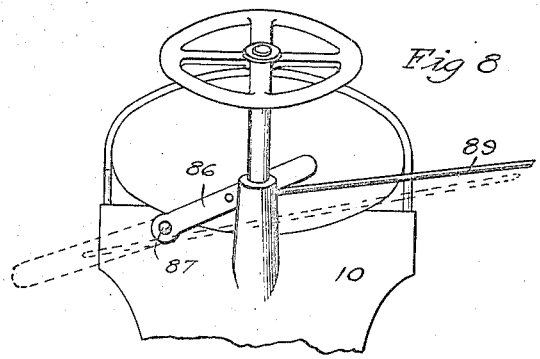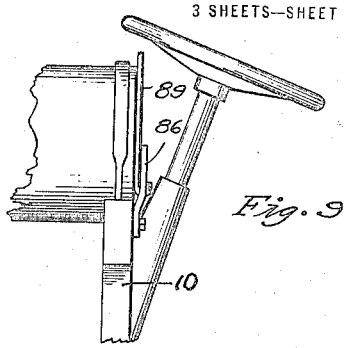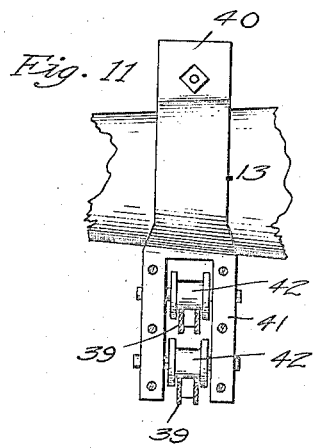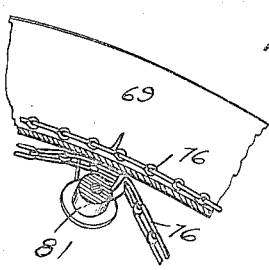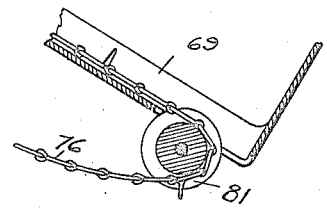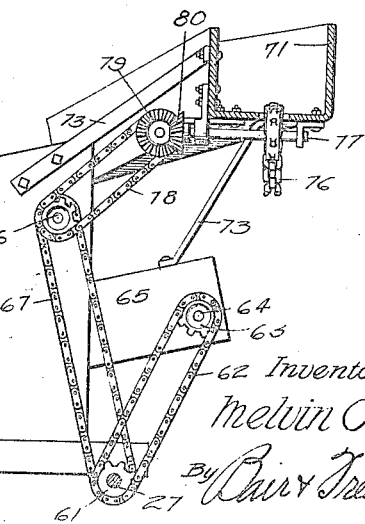

1,430,802

UNITED STATES PATENT OFFICE.

MELVIN O. DRAKE, OF STRATFORD, IOWA.

POWER-DRIVEN CORN PICKER.

Application filed January 3, 1921. Serial No. 434,563.

*To all whom it may concern:*

Be it known that I, MELVIN O. DRAKE, a citizen of the United States, residing at Stratford, in the county of Hamilton and State of Iowa, have invented a certain new and useful Power-Driven Corn Picker, of which the following is a specification.

The object of my invention is to provide a power driven corn picker which is comparatively of simple construction, very durable, and comparatively cheap.

More particularly it is my object to provide a corn picker which includes gathering mechanism and husking mechanism which are mounted on opposite sides of the tractor and secured thereto, and a conveyor device for delivering ears of corn from the gathering mechanism to the husking mechanism. The conveyor device being placed behind the tractor.

Another object of my device is to provide corn gathering mechanism and husking mechanism which are placed on opposite sides of the tractor, and a main drive shaft for operating the gathering mechanism and husking mechanism. The main drive shaft being driven from the main drive shaft of the tractor at a speed independent of the forward advance of the tractor.

Still another object is to provide with a tractor, a corn gathering mechanism supported on a wheel on one side of the tractor, and a corn husking mechanism supported on a wheel on the opposite side of the tractor. The wheel of the gathering mechanism and the wheel of the husking mechanism being fastened to the adjacent wheels of the tractor, whereby they will operate in unison and add materially to the traction surface of the tractor.

Still another object is to provide a frame upon which the corn gathering mechanism is mounted, the frame being capable of tilting movement so that the gathering mechanism may be raised off of the ground when desired. The parts being so arranged that the frame may be tilted and locked in any of its adjusted positions.

Still another object is to provide in such a device a conveyor for delivering corn from the gathering mechanism to the husking mechanism. The conveyor device being so arranged that the gathering mechanism may be capable of tilting movement without affecting the conveyor device.

Still another object is to provide a draw bar attachment to which a wagon may be hitched, and an elevating device for elevating corn from the husking mechanism into the wagon. The elevating device being controlled from a point adjacent to the driver's seat.

A further object is to provide a clutch member for rendering the entire device inoperative while the device is being moved across the ground.

Still a further object is to provide corn gathering mechanism and corn husking mechanism adapted to be placed on opposite sides of the tractor, the parts being so arranged that the tractor may be detached or disconnected from the remainder of the device and used for other purposes.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Figure 1 is a top, plan view of my invention showing the device complete and ready for operation.

Figure 2 is a rear elevation of the same, showing the conveyor for transmitting the ears of corn from the snapping rollers to the husking rollers.

Figure 3 is a transverse, central, sectional view taken on the line 3—3 of Figure 1, parts being broken away to better illustrate the construction.

Figure 4 is an enlarged, detail view of the portion of the tractor adjacent to the seat, showing the controls for operating my device.

Figure 5 is a detail, sectional view showing how power is transmitted from the tractor to the main drive shaft of my device.

Figure 6 is a sectional view taken on the line 6—6 of Figure 1, showing how power is transmitted from the main drive shaft to the various operating parts of my device.

Figure 7 is a fragmentary view, illustrating how the movable frame which supports the snapping roller mechanism is supported.

Figure 8 is a front elevation of the dash of the tractor with one of the control levers shown thereon.

Figure 9 is a side elevation of Figure 8.

Figure 10 is a detail, sectional view taken on the line 10—10 of Figure 4, showing how the clutch control lever may be locked in inoperative position.

Figure 11 is a detail, sectional view illustrating the guide rollers for the main drive chain; and Figure 12 is a sectional view taken through a portion of the conveyor.

In the accompanying drawings I have used the reference numeral 10 to indicate an ordinary tractor which is provided with a pair of steerable wheels 11, and the rear traction wheels 12. The tractor 10 is provided with the ordinary selective speed gearing device, which is common in all makes of tractors. The tractor 10 includes the rear axle housing 13 and the differential housing 14.

A supporting wheel 15 mounted on the stub shaft 16 is placed adjacent to one of the rear traction wheels 12 of the tractor.

A rectangular frame member 17 has one of its sides supported on the axle housing 13 by means of the U-shaped clamp member 18. Bolts 19 are used for fastening the clamp member 18 to the frame 17.

The opposite side of the frame member 17 is supported on the stub shaft 16 adjacent to the wheel 15. The frame 17 supports the corn gathering mechanism 18, which is of ordinary construction and includes the gathering arms and the snapping rollers 19. A brace 20 extends from the forward side of the rectangular frame member 17 to the gathering arms of the gathering mechanism.

The supporting wheel 15 and one of the traction wheels 12 are received within the rectangular frame member 17, as illustrated in Figure 1 of the drawings.

On the opposite side of the tractor 10 is placed the wheel mounted frame 21 which includes the rear wheels 22 and 23; caster wheels 24 are mounted at the forward end of the frame 21.

The wheel 23 which supports the frame 21 is placed adjacent to one of the traction wheels 12. The traction wheels 12 are locked or fastened to the wheels 15 and 23 by means of the lugs 25 which are held in position by means of the bolts 26.

From the construction of the parts just described it will be seen that rotation of the traction wheels 12 will impart rotation to the wheels 15 and 23. The fastening of the wheels together as described add materially to the tread surface and traction power of the tractor.

A main drive shaft 27 is mounted rearwardly of the tractor 10 and is supported on an arm 28 which is bolted to the differential housing 14 of the tractor. The arm 28 is reinforced by a second arm 29 which is bolted to the opposite side of the differential housing 14, and is connected to the arm 28 by means of the bolts 30.

One end of the drive shaft 27 is mounted in a bearing 31 on the frame 21. The opposite end of the drive shaft 27 is mounted in a bearing 32 which is pivoted in a support 33 on the frame 17. The purpose of providing a pivoted bearing member will be hereafter more fully set forth.

The tractor 10 is provided with a power shaft 34 upon which I fix a sprocket wheel 35. Loosely mounted on the drive shaft 27 is a sprocket wheel 36 which is formed integral with a clutch member 37.

A co-acting clutch member 38 is fixed to the shaft 27. The sprocket wheels 35 and 36 are connected together by means of a chain 39.

It is necessary to carry the chain below the axle housing 13, so I have provided a guide device which comprises a yoke member 40 which is fixed to the axle housing 13 and has a pair of spaced arms 41 at its lower end in which is journalled a pair of pulley wheels 42. The chain travels below each of the pulley wheels 42 and in this way the chain 39 is guided below the axle housing 13.

In order to operate the clutch member 37 on the shaft 27, I have provided a lever 43 which is pivoted to the arm 29 at 44. The lever 43 is brought adjacent to the driver's seat and is so spaced that the driver may move the lever for disconnecting the clutch members by the swinging of his knee outwardly.

A spring 45 is mounted on the shaft 27 between the clutch member 37 and the arm 28 which supports the shaft. The spring 45 normally, yieldingly holds the clutch in engagement.

In order to lock the clutch members in inoperative position, I have provided a short bar 46 which is fixed to the differential housing 14 and is provided with a series of openings 47. The lever 43 is provided with an opening 48 which is designed to register with the opening 47 so that a pin may be placed into the openings 48 and 47 for holding the openings in position which will render the clutch member inoperative.

The shaft 27 is provided with a universal joint 49 so as to permit up and down movement of the parts relative to each other. One end of the shaft 27 is operatively connected by means of gears (not shown) to the sprocket wheel 50 which in turn is connected to the sprocket wheel 51 on the shaft 52 by means of the chain 53. The shaft 52 drives the snapping rollers 19. The tractor 10 is provided with a seat 54.

The frame 17 which supports the gathering mechanism may be raised off of the ground when desired.

In order to raise and lower the frame carrying the gathering mechanism, I have provided a lever 55 pivoted at 56 to the differential housing 14. The lever 55 is provided with a spring actuated pawl 57 which engages the rack bar 58, which is fixed to the differential housing 14. The lever 55 is connected to the frame 17 at its forward end by means of a link 59.

It will be understood that the gathering mechanism is substantially balanced so that the movement of the lever rearwardly will cause the forward end of the gathering mechanism to be raised upwardly and off of the ground. The lever 55 may be locked in any of its positions for holding the gathering mechanism in any of its tilted positions.

In order to tilt the frame 17 and not disconnect the drive shaft 27, the pivoted bearing member 32 is provided.

On the opposite side of the tractor 10 from the gathering mechanism 18, is a husking mechanism 60, which is supported on the frame 21. The end of the shaft 27 adjacent to the husking mechanism 60 is provided with a sprocket wheel 61 which is connected by means of the chain 62 to a sprocket wheel 63 on the shaft 64. The shaft 64 operates a husk conveyor member 65.

The shaft 27 is connected to a short shaft 66 by means of a chain 67. The short shaft 66 transmits movement to the husking rollers 68.

In order to convey ears of corn which have been snapped from the stalks by the snapping rollers 19 to the husking rollers 68, I have provided a conveyor device A, which includes the chute members 69, 70 and 71; the chute member 69 is supported on the frame 17 by means of the brackets 72; the chute member 71 is supported on the frame 21 by means of the brackets 73; the chute member 70 has its ends connected to the free ends of the chute members 69 and 71 by means of the bolts 74.

Slots 75 are provided in the chute members 70 and 71 at the portions where the bolts 74 extend through, which permits pivotal movement of the chute members relative to each other, and which permits the chute member 69 to move with the frame member 17 when it is tilted.

A conveyor chain 76 conveys the ears of corn from the snapping rollers to the husking rollers, and is driven from the shaft 77 which is driven from the shaft 66 by means of the chain 78 and the beveled gears 79 and 80.

The conveyor chain 76 passes through the guide rollers 81. The chain is provided with a considerable amount of play so as to permit movement of the chute members relative to each other.

From the construction of the parts just described it will be seen that corn will be conveyed by means of the conveyor device A to the husking rollers 68.

A draw bar attachment 82 is fixed to the frame 21 and to the tractor 10 by means of a brace 83. A wagon 84, shown in Figure 1, may be hitched to the draw-bar attachment 82 by any suitable arrangement.

An elevating device 85 is designed to receive the ears of corn as the husks have been removed for elevating them into the wagon 84. The elevating device 85 is capable of being raised and lowered, and in order to accomplish this, I have provided a lever 86 on the tractor 10 which is pivoted at 87. A yoke member 88 is pivoted to the outer end of the elevating device 85, a link 89 connects the lever 86 to the yoke 88.

When it is desired to raise the elevating device the lever 86 is swung from the position shown in solid lines to the position shown in dotted lines in Figure 8 of the drawings.

The link 89 when moved to position shown in dotted lines is below the pivoted point 87 which means that the lever will be thrown past center and the elevating device 85 held in its raised position.

It will be seen that I have provided a complete device for gathering corn which can be operated by a single person. The parts of my device are so arranged that practically all the control levers that are necessary for controlling of the operation of the device are controlled from a point adjacent to the driver's seat.

One of the advantages of my device is the mounting of the gathering and husking mechanisms on opposite sides of the tractor, whereby the load is equalized and less power will be required to move the entire device across the field than would be required if the device were hitched to the rear end of the tractor.

Another advantage is the interlocking of the wheels of the gathering and husking mechanism, whereby added traction surface is obtained.

Another advantage resides in the fact that the tractor may be detached from the entire device and used for other purposes.

I claim as my invention:

1. In a corn harvesting machine, a tractor mounted on wheels, a corn gathering mechanism having a supporting wheel arranged at one side of said tractor, with the wheel of the corn gathering mechanism rigidly connected with a wheel of the tractor, said corn gathering mechanism having a frame pivotally supported, a husking mechanism having a supporting wheel rigidly connected with a wheel of the tractor on the opposite side thereof from the corn gathering mechanism, a conveyor for carrying ears of corn from the corn gathering mechanism to the corn husking mechanism, having parts connected together for permitting the tilting of the frame of the corn gathering mechanism.

2. In a corn harvesting machine, a tractor mounted on wheels, a corn gathering mechanism having a supporting wheel arranged at one side of said tractor, with the wheel of the corn gathering mechanism rigidly connected with the wheel of the tractor, said corn gathering mechanism having a frame pivotally supported, a husking mechanism having a supporting wheel rigidly connected with a wheel of the tractor on the opposite side thereof from the corn gathering mechanism, a conveyor for carrying ears of corn from the corn gathering mechanism to the corn husking mechanism, having parts connected together for permitting the tilting of the frame of the corn gathering mechanism, and a lever device arranged adjacent to the driver's seat for tilting the frame of the corn gathering mechanism and for locking it in any of its tilted positions.

3. In a corn harvesting machine, a tractor mounted on wheels, a corn gathering mechanism having a supporting wheel arranged at one side of said tractor, with the wheel of the corn gathering mechanism rigidly connected with a wheel of the tractor, said corn gathering mechanism having a frame pivotally supported, a husking mechanism having a supporting wheel rigidly connected with a wheel of the tractor on the opposite side thereof from the corn gathering mechanism, a conveyor for carrying ears of corn from the corn gathering mechanism to the corn husking mechanism, having parts connected together for permitting the tilting of the frame of the corn gathering mechanism, a driven shaft for operating said corn gathering mechanism and said corn husking mechanism, a power shaft on said tractor, means for operatively connecting said power shaft with said driven shaft whereby said corn gathering mechanism and said corn husking mechanism may be operated independent of the speed of the forward advance of the tractor.

4. In a corn harvesting machine, the combination of a tractor with a corn gathering mechanism mounted at one side of said tractor, and operatively connected with the tractor, a corn husking mechanism mounted at the other side of the tractor and connected with the tractor, a conveyor for connecting the corn gathering mechanism with the corn husking mechanism, means for operatively connecting the power plant of the tractor with the corn gathering mechanism, and the corn husking mechanism, means for tilting said corn gathering mechanism, said means including a frame pivotally mounted, a lever pivoted adjacent to the driver's seat and a link connected to the frame and to the lever, whereby movement of the lever will impart movement to the frame, and means for locking said frame in any of its adjusted positions.

5. In combination with a tractor, gathering and husking mechanisms including snapping rollers, husking roller mechanism and a conveyor device for carrying the grain from the snapping rollers to the husking rollers, said gathering mechanism and husking mechanism being mounted on wheels and spaced adjacent to the opposite sides of the tractor, said last wheels being in alignment with the wheels of the tractor, means for interlocking the wheels of the tractor with the wheels of said gathering mechanism and said husking mechanism, said means including lugs bolted to the adjacent wheels for causing them to move in unison with each other, means for driving said gathering mechanism and husking mechanism independent of their forward movement over the ground, means for raising said gathering mechanism off the ground to position where the same will be inoperative, said last means being controlled by a lever adjacent to the driver's seat on the tractor.

6. In combination with a tractor, gathering mechanism and husking mechanism including snapping rollers, husking roller mechanism and a conveyor device for carrying the grain from the snapping rollers to the husking rollers, said gathering mechanism and said husking mechanism being mounted on wheels and spaced adjacent to the opposite sides of the tractor, said last wheels being in alignment with the wheels of the tractor, means for interlocking the wheels of the tractor with the wheels of said gathering mechanism and said husking mechanism, said means including lugs bolted to the adjacent wheels for causing them to move in unison with each other, means for driving said gathering mechanism and said husking mechanism independent of their forward movement over the ground means for raising said snapping mechanism off the ground to position where the same will be inoperative, said last means being controlled by a lever adjacent to the driver's seat on the tractor, and means for locking said snapping mechanism in any of its raised positions.

7. In combination with a tractor, gathering mechanism and husking mechanism including snapping rollers, husking roller mechanism and a conveyor device for carrying the grain from the snapping rollers to the husking rollers, said gathering mechanism and husking mechanism being mounted on wheels and spaced adjacent to the opposite sides of the tractor, said last wheels being in alignment with the wheels of the tractor means for interlocking the wheels of the tractor with the wheels of said gathering mechanism and said husking mechanism, said means including lugs bolted to the adjacent wheels for causing them to move in unison with each other, means for driving said gathering mechanism and said husking mechanism independent of their forward movement over the ground, means for raising said snapping mechanism off the ground to position where the same will be inoperative, said last means including a frame pivotally mounted on the tractor and being controlled by a lever adjacent to the driver's seat on the tractor.

8. In a corn harvesting machine, a tractor, supporting wheels, a corn gathering mechanism having a frame pivotally mounted at one side of said tractor, a corn husking mechanism having a frame supported at the other side of said tractor, and a conveyor for conveying ears of corn from the corn gathering mechanism to the corn husking mechanism, having parts pivotally connected together for permitting the tilting of the frame of the corn gathering mechanism, a power shaft, a driven shaft, means for operatively connecting said driven shaft with the power shaft, means for operatively connecting the driven shaft with the husking mechanism, means including a shaft and a universal joint for operatively connecting the driven shaft with the corn gathering mechanism, said husking mechanism being mounted on a frame, a draw bar fixed to said last frame and connected to the tractor by a brace member, said draw bar being designed to extend forwardly of the husking mechanism and beyond its side, whereby a wagon may be hitched thereto for receiving the ears of corn after they have been husked.

9. In a corn harvesting machine, a tractor, supporting wheels, a corn gathering mechanism having a frame pivotally mounted at one side of said tractor, a corn husking mechanism having a frame supported at the other side of said tractor, and a conveyor for conveying ears of corn from the corn gathering mechanism to the corn husking mechanism, having parts pivotally connected together for permitting the tilting of the frame of the corn gathering mechanism, a power shaft, a driven shaft, means for operatively connecting said driven shaft with the power shaft, means for operatively connecting the driven shaft with the husking mechanism, means including a shaft and a universal joint for operatively connecting the driven shaft with the corn gathering mechanism, said husking mechanism being mounted on a frame, a draw bar fixed to said last frame and connected to the tractor by a brace member, said draw bar being designed to extend forwardly of the husking mechanism and beyond its side, whereby a wagon may be hitched thereto for receiving the ears of corn after they have been husked, and an elevator device for elevating corn from the husking mechanism into the wagon.

10. In a corn harvesting machine, a tractor, supporting wheels, a corn gathering mechanism having a frame pivotally mounted at one side of said tractor, a corn husking mechanism having a frame supported at the other side of said tractor, and a conveyor for conveying ears of corn from the corn gathering mechanism to the corn husking mechanism, having parts pivotally connected together for permitting the tilting of the frame of the corn gathering mechanism, a power shaft, a driven shaft, means for operatively connecting said driven shaft with the power shaft, means for operatively connecting the driven shaft with the husking mechanism, means including a shaft and a universal joint for operatively connecting the driven shaft with the corn gathering mechanism, said husking mechanism being mounted on a frame, a draw bar fixed to said last frame and connected to the tractor by a brace member, said draw bar being designed to extend forwardly of the husking mechanism and beyond its side, whereby a wagon may be hitched thereto for receiving the ears of corn after they have been husked, and an elevator device for elevating corn from the husking mechanism into the wagon.

11. In a corn harvesting machine, a tractor, supporting wheels, a corn gathering mechanism having a frame pivotally mounted at one side of said tractor, a corn husking mechanism having a frame supported at the other side of said tractor, and a conveyor for conveying ears of corn from the corn gathering mechanism to the corn husking mechanism, having parts pivotally connected together for permitting the tilting of the frame of the corn gathering mechanism, a power shaft, a driven shaft, means for operatively connecting said driven shaft with the power shaft, means for operatively connecting the driven shaft with the husk mechanism, means including a shaft and a universal joint for operatively connecting the driven shaft with the corn gathering mechanism, a clutch on said driven shaft for rendering it inoperative, a lever for controlling said clutch arranged adjacent to the driver's seat on the tractor, the parts being so arranged that the clutch may be locked in its inoperative position as and for the purposes stated.

12. In a corn harvesting machine, a tractor having a selective speed gearing device thereon, supporting wheels, a corn gathering mechanism having a frame pivotally mounted at one side of said tractor, a corn husking mechanism having a frame supported at the other side of said tractor, and a conveyor for conveying ears of corn from the corn gathering mechanism to the corn husking mechanism, having parts pivotally connected together for permitting the tilting of the frame of the corn gathering mechanism, a power shaft, a driven shaft, means for operatively connecting said driven shaft with the power shaft, means for operatively connecting the driven shaft with the husking mechanism, means including a shaft and a universal joint for operatively connecting the driven shaft with the corn gathering mechanism, the parts being so arranged that the gathering and husking mechanism will travel at a predetermined speed while the speed of the forward advance of the tractor may be varied by the selective speed gearing device.

Des Moines, Iowa, December 3, 1920.

MELVIN O. DRAKE.